(12) United States Patent
Hwang et al.

(10) Patent No.: US 8,597,833 B2
(45) Date of Patent: Dec. 3, 2013

(54) RECHARGEABLE LITHIUM BATTERY

(75) Inventors: Cheol-Hee Hwang, Suwon-si (KR);
Bong-Chull Kim, Suwon-si (KR);
Dong-Yung Kim, Suwon-si (KR);
Se-Ho Park, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 789 days.

(21) Appl. No.: 12/649,537

(22) Filed: Dec. 30, 2009

(65) Prior Publication Data

US 2010/0279172 A1 Nov. 4, 2010

(30) Foreign Application Priority Data

Apr. 29, 2009 (KR) .................. 10-2009-0037725

(51) Int. Cl.
*H01M 4/46* (2006.01)

(52) U.S. Cl.
USPC .................................. 429/231.6; 429/218.1

(58) Field of Classification Search
USPC ........................................... 429/231.6, 218.1
See application file for complete search history.

(56) References Cited

U.S. PATENT DOCUMENTS

| | | | |
|---|---|---|---|
| 5,759,719 A | 6/1998 | Mao | |
| 6,682,850 B1 | 1/2004 | Numata et al. | |
| 7,476,467 B2 | 1/2009 | Park et al. | |
| 7,736,804 B2 | 6/2010 | Kim et al. | |
| 2005/0136330 A1 | 6/2005 | Mao et al. | |
| 2006/0257737 A1 | 11/2006 | Goh et al. | |
| 2008/0008933 A1 | 1/2008 | Lampe-Onnerud | |
| 2010/0273058 A1 | 10/2010 | Lee et al. | |

FOREIGN PATENT DOCUMENTS

| | | |
|---|---|---|
| CN | 1937288 A | 3/2007 |
| CN | 1938883 A | 3/2007 |
| CN | 101038816 A | 9/2007 |
| JP | 2000-77071 A | 3/2000 |
| JP | 2000-195517 | 7/2000 |
| JP | 2001-345100 | 12/2001 |
| JP | 2002-270247 | 9/2002 |
| JP | 2003-331922 | 11/2003 |
| JP | 2004-014405 | 1/2004 |
| JP | 2004-031165 | 1/2004 |
| JP | 2005-174847 | 6/2005 |
| JP | 2006-202529 | 8/2006 |
| JP | 2006-294482 | 10/2006 |
| JP | 2007-095443 | 4/2007 |
| JP | 2007-149364 | 6/2007 |
| JP | 2008-027897 | 2/2008 |
| JP | 2003-217568 | 7/2008 |
| JP | 2008-186732 | 8/2008 |
| JP | 2008-277232 | 11/2008 |
| JP | 2009-535776 A | 10/2009 |
| KR | 10-1999-0076829 | 10/1999 |
| KR | 10-2003-0076153 A | 9/2003 |
| KR | 10-2006-0087178 A | 8/2006 |
| KR | 10-2006-0103031 A | 9/2006 |
| KR | 10-2006-0111393 A | 10/2006 |
| KR | 10-2007-0034254 | 3/2007 |
| KR | 10-2007-0100957 A | 10/2007 |
| WO | WO 97/01191 A2 | 1/1997 |

OTHER PUBLICATIONS

European Search Report for European Patent Application No. EP10151646.6-1227 dated Aug. 25, 2010.
The Notification of the First Office Action issued by the State Intellectual Property Office of P.R. China dated Jun. 26, 2012, 15 pages.
KIPO Office Action issued from the Korean Patent Office dated Mar. 31, 2011, 3 pages.
Japanese Office Action issued by the Japanese Patent Office dated Sep. 4, 2012, 3 pages.
The Notification of the Second Office Action issued by the State Intellectual Property Office of P.R. China, dated Feb. 25, 2013, 14 pages.
Chinese Office Action dated Sep. 5, 2013, issued in connection with corresponding Chinese Patent Application No. 201010003342.0.

*Primary Examiner* — Stuart Hendrickson
(74) *Attorney, Agent, or Firm* — Knobbe Martens Olson & Bear, LLP

(57) ABSTRACT

A rechargeable lithium battery including: a negative electrode having a composite negative active material of a metal and a carbonaceous material; a positive electrode having a mixed positive active material of about 90 to 99 wt % of a first positive active material selected from cobalt, manganese, phosphate acid-based, or combinations thereof and about 1 to about 10 wt % of a nickel-based second positive active material; and a non-aqueous electrolyte.

12 Claims, 2 Drawing Sheets

RECHARGEABLE LITHIUM BATTERY

CROSS-REFERENCE TO RELATED APPLICATION

This application claims the benefit of Korean Application No. 10-2009-0037725, filed Apr. 29, 2009 in the Korean Intellectual Property Office, the disclosure of which is incorporated herein by reference.

BACKGROUND OF THE INVENTION

1. Field of the Invention

The disclosure relates to a rechargeable lithium battery.

2. Description of the Related Art

Lithium rechargeable batteries have recently drawn attention as power sources for small portable electronic devices. Such batteries use an organic electrolyte solution, thereby have twice the discharge voltage of a conventional battery using an alkali aqueous solution, and accordingly have high energy density.

For positive active materials of a rechargeable lithium battery, lithium-transition element composite oxides capable of intercalating lithium, such as $LiCoO_2$, $LiMn_2O_4$, $LiNiO_2$, $LiNi_{1-x}CO_xO_2$ (0<x<1), and so on have been investigated. As for negative active materials of a rechargeable lithium battery, various carbon-based materials such as artificial graphite, natural graphite, and hard carbon, which can all intercalate and deintercalate lithium ions, have been used. However, recently there has been research into non-carbon-based negative active materials such as Si because of the need for stability and high capacity.

SUMMARY OF THE INVENTION

Aspects of the present invention provide a rechargeable lithium battery having improved cycle-life characteristics. Embodiments of the present invention are not limited to the above technical purpose, and a person of ordinary skill in the art can understand other technical purposes.

An embodiment of the present invention provides a rechargeable lithium battery including: a negative electrode having a composite negative active material of metal and a carbonaceous material; a positive electrode having a mixed positive active material of about 90 to about 99 wt % of a first positive active material selected from the group consisting of cobalt, manganese, phosphate-based materials, and combinations thereof, about 1 to about 10 wt % of a nickel-based second positive active material; and a non-aqueous electrolyte. The rechargeable lithium battery according to embodiments of the present invention shows excellent cycle-life characteristics.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
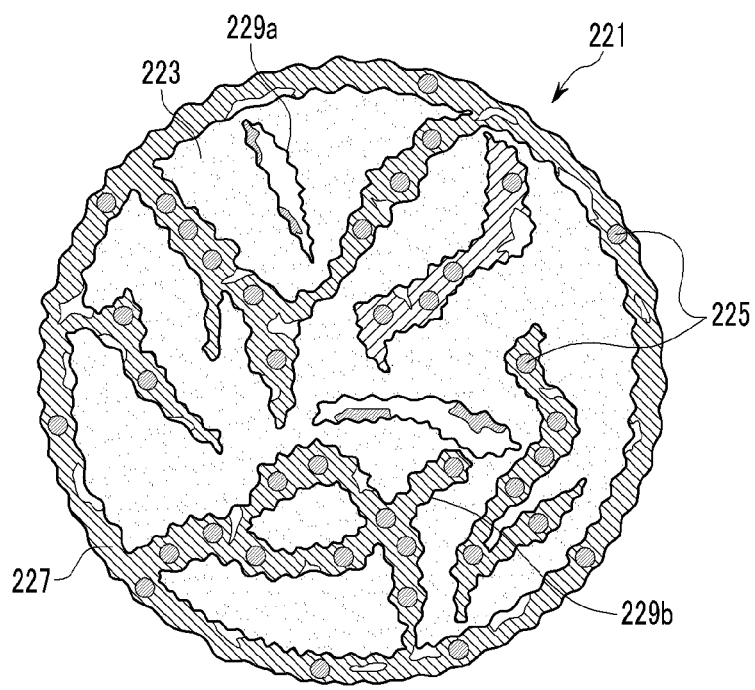
FIG. 1 is a view of a negative active material according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

An embodiment of the present invention provides a lithium rechargeable battery including a negative electrode having a negative active material, a positive electrode having a positive active material, and a non-aqueous electrolyte. The negative active material is a composite of a carbonaceous material and metal. Non-limiting examples of the carbonaceous material may include crystalline carbon, amorphous carbon, and combinations thereof. The metal refers to a material having excellent thermo- or electrical-conductivity, and non-limiting examples thereof include conductive metals generally such as alkali metals as well as semi-metals having semi-conductivity such as Si.

The crystalline carbon may include at least one natural graphite or artificial graphite, or a mixture thereof. The natural graphite or artificial graphite may have a form of shapeless, sheet, flake, spherical-shaped or fiber-shaped. The amorphous carbon may include at least one of soft carbon (low temperature fired carbon) or hard carbon, mesophase pitch carbide, fired coke, or a mixture thereof.

Examples of the metal include one selected from Si, an Si-T alloy (where T is an element selected from the group consisting of an alkali metal, an alkaline-earth metal, a group 13 element, a group 14 element, a transition element, a rare earth element, and combinations thereof, and is not Si), Sn, an Sn—Z alloy (where Z is an element selected from the group consisting of an alkali metal, an alkaline-earth metal, a IUPAC group 13 element (old IUPAC IIIB, CAS Group IIIA), a group 14 element (old IUPAC IVB, CAS IVA), a transition element, a rare earth element, and combinations thereof and is not Sn), Pb, In, As, Sb, Ag, or combinations thereof. The elements T and Z may be selected from Mg, Ca, Sr, Ba, Sc, Y, La, Ti, Zr, Hf, V, Nb, Ta, Cr, Mo, W, Re, Fe, Ru, Os, Co, Rh, Ir, Ni, Pd, Pt, Cu, Ag, Au, Zn, Cd, B, Ge, P, As, Sb, Bi, S, Se, Te, and combinations thereof.

The composite of a carbonaceous material and a metal may include a mixture in which the carbonaceous material is physically mixed with the metal, or a core-shell type including a crystalline carbon core having pores, an amorphous carbon shell formed on the surface of the core, metal nanoparticles dispersed in the pores, and amorphous carbon present in the pores. In one embodiment, the composite of a carbonaceous material and a metal is the core-shell type since the structure suppresses side-reactions and improves the cycle-life characteristics. When the composite is a mixture, it may be crystalline, amorphous, or a mixture thereof without limiting the crystallinity of the carbonaceous material. In addition, the mixing ratio can be suitably adjusted, and is not limited.

The negative active material including the core-shell type composite may have a structure similar to that shown in FIG. 1. The negative active material 221 shown in FIG. 1 includes a crystalline carbon core 223 having pores thereinside, and an amorphous carbon shell 227. The pores include closed pores 229a formed inside the core not connected with the shell 227, and open pores 229b formed extending from the inside to connect with the shell 227. In addition, metal nano-particles 225 may be dispersed in the open pores 229b, and amorphous carbon may be present in both the open pores 229b and the closed pores 229a.

The pores 229a and 229b may be a sheet or flake-shaped, and a network thereof may be formed inside the core 223. The negative active material may have porosity of about 30 to about 50 volume % based on the entire volume of the negative active material. When the porosity is within that range, it is possible to absorb the expanded volume of the active material during the expansion of the negative active material, and the cycle-life characteristic is improved.

According to one embodiment, the metal nano-particles have an average particle diameter of about 600 nm or less, and in another embodiment, 100 nm to 500 nm. In addition, the metal nano-particles may be included at about 5 wt % or more, and in another embodiment, 5 to 30 wt %, based on the total weight of the negative active material.

According to one embodiment, the amorphous carbon is included at about 10 to about 15 wt % based on the total weight of the negative active material, while the crystalline carbon is included at about 55 to about 85 wt % based on the total weight of negative active material. When the amorphous carbon is included within the range, it is possible to provide a composite negative active material including the metal and the carbonaceous material.

The core-shell type composite negative active material 221 has an average particle diameter of about 5 to about 40 μm. For preparing the core-shell type composite negative active material 221, first, fine crystalline carbon particles are milled to provide a crystalline carbon core 223. The fine particles are agglomerated during the milling process to provide closed pores 229a and open pores 229b inside the core 223.

The carbon core 223 is immersed in a metal nano-particle solution. The metal nano-particle solution may be inserted in the open pores 229b of the carbon core 223 as a result of the immersing process.

Subsequently, the obtained product is mixed with an amorphous carbon precursor and subjected to heat treatment to provide a core-shell type negative active material 221. The precursor of the amorphous carbon may include coal pitch, mesophase pitch, petroleum pitch, petroleum oil, petroleum heavy oil, or a polymer resin such as phenol resin, furan resin, polyimide resin, and so on.

The heat treatment is performed at about 800 to about 1200° C. for about 2 to about 10 hours. The precursor of the amorphous carbon is carbonized according to the heat treatment, and then transformed into amorphous carbon and inserted into the closed pores 229a and the open pores 229b of the core 223 and provides a shell 227 on the core surface.

The positive active material may be a mixed positive active material including about 90 to about 99 wt % of a first positive active material selected from cobalt, manganese, a phosphate-based material, or combinations thereof, and about 1 to about 10 wt % of a nickel-based second positive active material. According to one embodiment, it includes 95 to 97 wt % of the first positive active material and 3 to 5 wt % of the second positive active material. When the first positive active material and the second positive active material are included within the range, it is possible to improve the cycle-life characteristics without causing deterioration of the discharge capacity or the charge and discharge efficiency.

When the positive active material is prepared by mixing the first and second positive active materials, the potential of the negative electrode is not increased so as to decrease the utilization of metal among components for the negative active material during the charge and discharge process. In addition, when the utilization of the metal is decreased in such manner, the side-reaction of between the negative active material and the electrolyte solution is decreased, and a Li-source decrease caused during the charge and discharge is compensated for by the nickel-based compound, so as to improve the cycle-life characteristics.

The first positive active material may be selected from cobalt-based, manganese-based, and phosphate-based materials, or combinations thereof, and may include at least one compound represented by the following Formulae 1 to 9.

$$Li_aA_{1-b}X_bD_2 (0.90 \le a \le 1.8, 0 \le b < 0.5)$$ [Formula 1]

$$Li_aE_{1-b}X_bO_{2-c}D_c (0.90 \le a \le 1.8, 0 \le b < 0.5, 0 \le c \le 0.05)$$ [Formula 2]

$$LiE_{2-b}X_bO_{4-c}D_c (0 \le b < 0.5, 0 \le c \le 0.05)$$ [Formula 3]

$$Li_aCoG_bO_2 (0.90 \le a \le 1.8, 0.001 \le b \le 0.1)$$ [Formula 4]

$$Li_aMnG_bO_2 (0.90 \le a \le 1.8, 0.001 \le b \le 0.1)$$ [Formula 5]

$$Li_aMn_2G_bO_4 (0.90 \le a \le 1.8, 0.001 \le b \le 0.1)$$ [Formula 6]

$$Li_{(3-f)}J_2(PO_4)_3 (0 \le f \le 2)$$ [Formula 7]

$$Li_3Fe_2(PO_4)_3$$ [Formula 8]

$$LiFePO_4$$ [Formula 9]

In the above Formulae 1 to 9, A is selected from Co, Mn, or combinations thereof;
X is selected from Al, Ni, Co, Mn, Cr, Fe, Mg, Sr, V, a rare earth element, or combinations thereof;
D is selected from O, F, S, P, or combinations thereof;
E is selected from Co, Mn, or combinations thereof;
G is selected from Al, Cr, Mn, Fe, Mg, La, Ce, Sr, V, or combinations thereof; and
J is selected from V, Cr, Mn, Co, Ni, Cu, or combinations thereof.

The second positive active material may include at least one compound represented by the following Formulae 10 or 11.

$$Li_gNi_hL_{1-j}O_e$$ [Formula 10]

wherein, $0.8 \le g \le 2$, $0 \le h \le 1$, e ranges from about 1 to about 2, $0 \le j \le 1$, $0 \le h+j \le 1$, and
L is selected from Al, Mn, Mg, Zr, La, or combinations thereof.

$$Li_xNi_yCo_zL'_{1-y-z}O_q$$ [Formula 11]

wherein, $0.65 \le x \le 1$, $0 \le y \le 1$, $0 \le z \le 1$, $0 \le y+z \le 1$, q ranges from about 1.8 to about 2, $0 \le y+z \le 1$, and
L' is selected from Al, Mn, Mg, Zr, La, or combinations thereof.

According to one embodiment of the present invention, the rechargeable lithium battery may have an N/P ratio of about 1.03 to about 1.12, which is the ratio of the negative electrode capacity to the positive electrode capacity.

In addition, according to one embodiment, the negative electrode may have a potential of about 0.9V or less, and in another embodiment, 0.7 to 0.9V, which are measured using a 3-electrode potential measurement including the positive electrode, the negative electrode, and the lithium metal counter electrode. The measuring device for electrode potential in a 3-electrode system is manufactured by close-contacting a lithium metal counter electrode to an electrode element that includes the positive electrode, the negative electrode and a separator interposed between the positive electrode and the negative electrode; attaching a tab to the positive electrode, the negative electrode, and the lithium metal counter electrode; enclosing the product within a battery case; and injecting an electrolyte solution therein. The electrode assembly may be a cylindrical jelly-roll-type or a prismatic jelly-roll-type, but it is not limited thereto. When the electrode assembly is a cylindrical jelly-roll-type, the lithium metal counter electrode is disposed under the same; on the other hand, when the electrode assembly is a prismatic jelly-roll-type, the electrode assembly may be disposed on the side direction (wide surface direction). In addition, the lithium metal counter electrode may be circular having a diameter of about 15 mm, a square of about 1×1 cm, or a rectangular bar, but is not limited thereto.

When the potential is measured, the charge and discharge are performed under the discharge condition of about 0.02C to 0.5C, 4.35V cut-off charge, to about 0.02C to 0.5C, 2.5V cut-off discharge.

The negative electrode includes a binder, and optionally a conductive material. The positive electrode includes a binder and a conductive material. The binder improves binding properties of active material particles with one another and with a current collector. Examples of the binder include at least one selected from polyvinyl alcohol, carboxymethyl cellulose, hydroxypropyl cellulose, polyvinyl chloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like, but are not limited thereto.

The conductive material is included to improve electrode conductivity. Any electrically conductive material may be used as a conductive material unless it causes a chemical change. Examples of the conductive material include carbon-based materials such as natural graphite, artificial graphite, carbon black, acetylene black, ketjen black, carbon fiber, and the like; metal powder or metal fiber materials such as copper, nickel, aluminum, silver, and the like; or conductive polymers such as polyphenylene derivatives; or mixtures thereof.

The negative and positive electrodes may be fabricated by a method including mixing the active material, a conductive material (optionally added in a negative electrode), and a binder into an active material composition and coating the composition on a current collector. The electrode manufacturing method is well known, and thus is not described in detail in the present specification. The current collector for a negative electrode may be selected from a copper foil, a nickel foil, a stainless steel foil, a titanium foil, a nickel foam, a copper foam, a polymer substrate coated with a conductive metal, or combinations thereof. The current collector for a positive electrode may be Al, but is not limited thereto. The solvent may include N-methylpyrrolidone, but it is not limited thereto.

In a rechargeable lithium battery according to one embodiment of the present invention, the non-aqueous electrolyte includes a non-aqueous organic solvent and a lithium salt. The non-aqueous organic solvent acts as a medium for transmitting ions taking part in the electrochemical reaction of the battery. The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (also known as ethylmethyl carbonate, MEC or EMC), ethylene carbonate (EC), propylene carbonate (PC), butylene carbonate (BC), and the like. Examples of the ester-based solvent may include methyl acetate, ethyl acetate, n-propyl acetate, dimethyl acetate, methyl propionate, ethyl propionate, γ-butyrolactone, 5-decanolide, γ-valerolactone, dl-mevalonolactone, γ-caprolactone, and the like. Examples of the ether-based solvent include dibutyl ether, tetraglyme, diglyme, 1,2-dimethoxyethane, 2-methyltetrahydrofuran, tetrahydrofuran, and the like, and examples of the ketone-based solvent include cyclohexanone and the like. Examples of the alcohol-based solvent include ethyl alcohol, isopropyl alcohol, and so on, and examples of the aprotic solvent include nitriles such as R—CN (wherein R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, the mixture ratio can be controlled in accordance with desirable battery performance.

The carbonate-based solvent may include a mixture of a cyclic carbonate and a linear carbonate. The cyclic carbonate and the chain carbonate are mixed together in the volume ratio of about 1:1 to about 1:9, and when the mixture is used as an electrolyte, the electrolyte performance may be enhanced.

In addition, the electrolyte of one embodiment of the present invention may further include mixtures of carbonate-based solvents and aromatic hydrocarbon-based solvents. The carbonate-based solvents and the aromatic hydrocarbon-based solvents are preferably mixed together in the volume ratio of about 1:1 to about 30:1.

The aromatic hydrocarbon-based organic solvent may be represented by the following Formula 12.

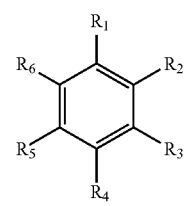

[Formula 12]

In the above Formula 12, $R_1$ to $R_6$ are independently hydrogen, a halogen, a C1 to C10 alkyl, a C1 to C10 haloalkyl, or combinations thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylenes, or combinations thereof. The xylenes may include p-xylene, o-xylene, m-xylene, or combinations thereof.

The non-aqueous electrolyte may further include vinylene carbonate or an ethylene carbonate-based compound of the following Formula 13.

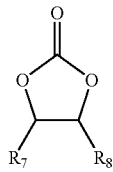

[Formula 13]

In the above Formula 13, $R_7$ and $R_8$ are independently hydrogen, a halogen, a cyano (CN), a nitro ($NO_2$), or a C1 to C5 fluoroalkyl, provided that at least one of $R_7$ and $R_8$ is a halogen, a nitro ($NO_2$), or a C1 to C5 fluoroalkyl and $R_7$ and $R_8$ are not simultaneously hydrogen.

The ethylene carbonate-based compound includes difluoroethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The use amount of the additive for improving cycle life may be adjusted within an appropriate range.

The lithium salt supplies lithium ions in the battery, and operates a basic operation of a rechargeable lithium battery and improves lithium ion transport between positive and negative electrodes. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_2C_2F_5)_2$, $LiC_4F_9SO_3$, $LiClO_4$, $LiAlO_2$, $LiAlCl_4$, $LiN(C_xF_{2x-1}SO_2)(C_yF_{2y-1}SO_2)$, (where x and y are natural numbers), LiCl, LiI, and $LiB(C_2O_4)_2$ (lithium bisoxalate borate, LiBOB). The lithium salt may be used at about a 0.1 to 2.0 M concentration. When the lithium salt is included at the above concentration range, electrolyte performance and lithium ion mobility may be enhanced due to optimal electrolyte conductivity and viscosity.

The rechargeable lithium battery may further include a separator between the negative electrode and the positive electrode, as needed. Non-limiting examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 2:
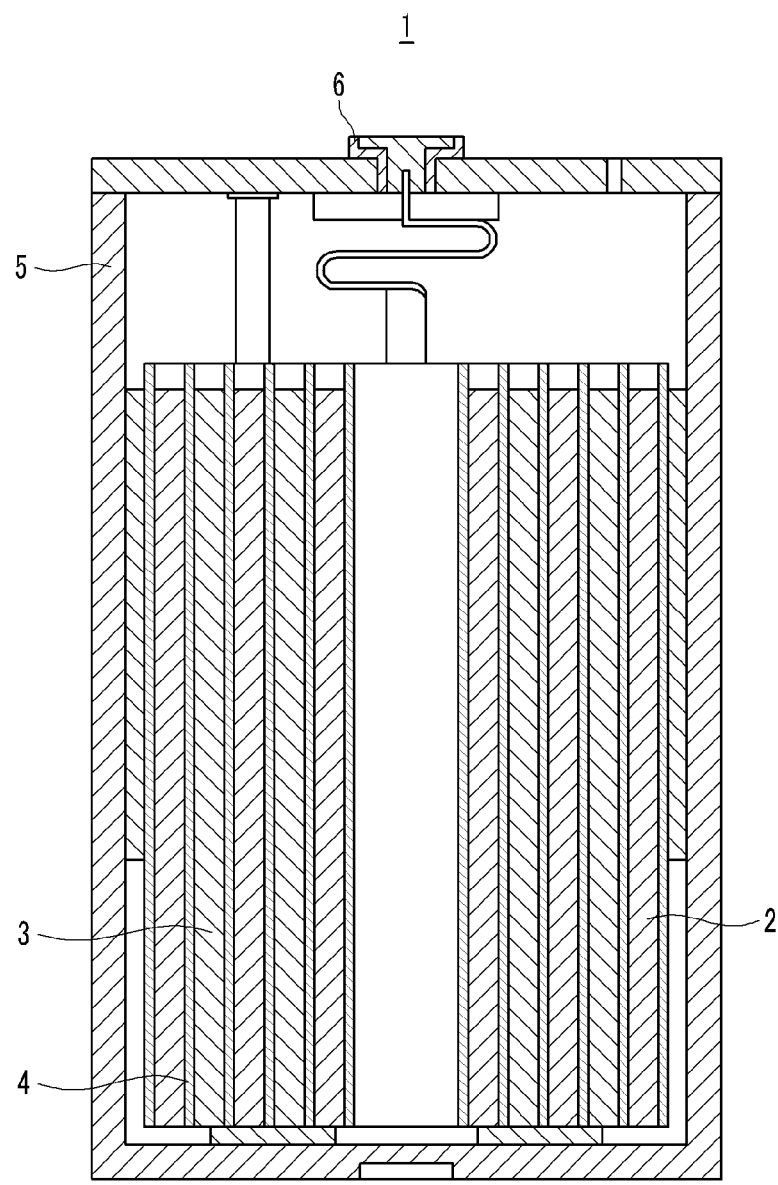
FIG. 2 shows a structure of a rechargeable lithium battery according to another embodiment of the present invention.

FIG. 2 is a schematic view of a representative structure of a rechargeable lithium battery. FIG. 2 illustrates a cylindrical rechargeable lithium battery 1, which includes a negative electrode 2, a positive electrode 3, a separator 4 interposed between the negative electrode 2 and the positive electrode 3, an electrolyte solution (not shown) impregnating the separator 4, a battery case 5, and a sealing member 6 sealing the battery case 5.

The following examples illustrate the present invention in more detail. These examples, however, should not in any sense be interpreted as limiting the scope of the present invention.

Example 1

1) Fabrication of Positive Electrode

A mixed positive active material of 97 wt % of $LiCoO_2$ and 3 wt % of $LiNi_{0.8}Co_{0.15}Al_{0.05}O_2$, a polyvinylidene fluoride binder, and a carbon black conductive material were mixed in an N-methylpyrrolidone solvent to provide a positive active material slurry. The mixing ratio of the positive active material, the binder, and the conductive material was 94:3:3 wt %. The positive active material slurry was coated on an Al-foil current collector to provide a positive electrode in accordance with the general process of manufacturing a positive electrode.

2) Fabrication of Negative Electrode

Flake-shaped artificial graphite micro-particles having an average particle diameter of 3 was milled by a rotary mill to provide an artificial graphite core having an average particle diameter of 20 µm. During the milling process, the micro-particles were agglomerated with each other to provide pores including closed pores and open pores inside the obtained artificial graphite core.

The porosity of the graphite core formed during the agglomeration was 40%. Subsequently, silicon was pulverized to an average particle diameter of 250 nm by a bead mill to provide silicon nano-particles.

The silicon nano-particles were added to alcohol to provide a silicon nano-particle solution, and then the article graphite core was immersed in the silicon nano-particle solution. The silicon nano-particle solution was inserted into the open pores inside the artificial graphite core by the capillary phenomenon.

Subsequently, the obtained product was mixed with petroleum pitch and heated at 900° C. for 3 hours to provide a negative active material. The petroleum pitch was carbonized as a result of the heat treatment and was thereby transformed to a hard carbon and inserted in the closed pores and the open pores present in the artificial graphite core so as to provide a shell on the core surface.

The negative active material, the polyvinylidene fluoride binder, and the carbon black conductive material were mixed in a ratio of 94:3:3 wt % in an N-methylpyrrolidone solvent to provide a negative active material slurry. The negative active material slurry was coated on a Cu-foil current collector to provide a negative electrode in accordance with the general process of manufacturing a negative electrode.

A rechargeable lithium cell was fabricated using the positive electrode, the negative electrode, and the non-aqueous electrolyte in accordance with the general process. The non-aqueous electrolyte was a solution in which 1.3 M of $LiPF_6$ was dissolved in a mixed solvent of ethylene carbonate and diethyl carbonate (3:7 volume ratio). In addition, the positive active material and the negative active material were adjusted to have an N/P ratio of 1.03, which is a ratio of negative electrode capacity to positive electrode capacity.

Example 2

A rechargeable lithium cell was fabricated by the same procedure as in Example 1, except that the positive active material was prepared by mixing 97 wt % of $LiCoO_2$ and 3 wt % of $Li_2NiO_2$.

Comparative Example 1

A rechargeable lithium cell was fabricated by the same procedure as in Example 1, except that the positive active material included only $LiCoO_2$.

Each rechargeable lithium cell obtained from Examples 1 and 2 and Comparative Example 1 was measured to determine the cycle-life characteristic, and the results are shown in the following Table 1. The cycle-life characteristic was determined by repeating charge and discharge 100 times under the charge condition of 0.5C, 4.35V cut-off voltage, and the discharge condition of 0.2C, 2.5V cut-off voltage at room temperature, and the results are shown as a ratio of discharge capacity at the 100th cycle to that of the first cycle.

TABLE 1

|  | Cycle-life characteristic (%) | N/P ratio |
| --- | --- | --- |
| Comparative Example 1 | 57.1 | 1.03 |
| Example 1 | 74.2 | 1.03 |
| Example 2 | 91.3 | 1.03 |

As shown in Table 1, it is confirmed that the cases of Examples 1 and 2 including the mixed positive active material significantly improved the cycle-life characteristic compared to the case of Comparative Example 1 including only the cobalt-based positive active material.

Cylinder jelly rolls were fabricated using the positive electrodes and the negative electrodes obtained from each of Examples 1 and 2 and Comparative Example 1, and a lithium metal counter electrode surrounded with a polyethylene separator was disposed under the jelly roll. The lithium metal counter electrode was circular having a diameter of 15 mm. Each the positive electrode, the negative electrode, and the lithium metal counter electrode was connected with a tab, the outside thereof was covered with a pouch on the three surfaces; an electrolyte solution was injected therein, and the charge and discharge were performed to measure the negative electrode potential in a three electrode method.

The measured negative electrode potentials are shown in the following Table 2.

TABLE 2

|  | Negative electrode potential (V) | N/P ratio |
| --- | --- | --- |
| Comparative Example 1 | 0.92 | 1.03 |
| Example 1 | 0.78 | 1.03 |
| Example 2 | 0.70 | 1.03 |

As shown in Table 2, the negative electrode potentials of Examples 1 and 2 were significantly lower than that of Comparative Example 1. Since a lower potential causes a drop in the Si utilization rate of the negative active material, the lower potential can suppress the side reaction between the negative active material and the non-aqueous electrolyte, so it is anticipated that the cycle-life characteristic will be improved as shown in Table 1.

Example 3

A rechargeable lithium cell was fabricated by the same procedure as in Example 1, except that the positive active material was prepared by mixing 99 wt % of $LiCoO_2$ and 1 wt % of $Li_2NiO_2$.

Example 4

A rechargeable lithium cell was fabricated by the same procedure as in Example 1, except that the positive active material was prepared by mixing 95 wt % of $LiCoO_2$ and 5 wt % of $Li_2NiO_2$.

Example 5

A rechargeable lithium cell was fabricated by the same procedure as in Example 1, except that the positive active material was prepared by mixing 90 wt % of $LiCoO_2$ and 10 wt % of $Li_2NiO_2$.

Each rechargeable lithium cell obtained from Examples 2 to 5 and Comparative Example 1 was charged and discharged at 0.1C once, and the discharge capacity was measured. The results are shown in the following Table 3. In addition, the charge and discharge efficiency is shown in the following Table 3.

TABLE 3

|  | Discharge capacity (mAh/g) | Charge and discharge efficiency (%) |
| --- | --- | --- |
| Comparative Example 1 | 174.8 | 95 |
| Example 3 | 174.8 | 94 |
| Example 2 | 174.9 | 92 |
| Example 4 | 174.0 | 89 |
| Example 5 | 174.7 | 84 |

As shown in Table 3, Examples 2 to 5 had similar discharge capacity and charge and discharge efficiency to those of Comparative Example 1.

From the results shown in Tables 1 to 3, it is understood that the rechargeable lithium cells of Examples 1 to 5 improved the cycle-life characteristics without adversely affecting the discharge capacity and the charge and discharge efficiency.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. A rechargeable lithium battery comprising:
a negative electrode comprising a composite negative active material of a metal or a semi-metal and a carbonaceous material;
a positive electrode comprising a mixed positive active material of about 90 to about 99 wt % of a first positive active material selected from the group consisting of cobalt, manganese, phosphate-based materials, or combinations thereof, and about 1 to about 10 wt % of a nickel-based second positive active material; and a non-aqueous electrolyte;
wherein the metal or the semi-metal is one metal, semi-metal or alloy selected from the group consisting of Si, an Si-T alloy, where T is an element selected from an alkali metal, an alkaline-earth metal, a group 13 element, a group 14 element, a transition element, a rare earth element, or combinations thereof, and is not Si, Sn, a Sn—Z alloy, where Z is an element selected from an alkali metal, an alkaline-earth metal, a group 13 element, a group 14 element, a transition element, a rare earth element, or combinations thereof and is not Sn, and combination thereof; and wherein the second positive active material is a compound represented by the following Formulae 10 or 11:

$Li_gNi_hL_{1-j}O_e$         Formula 10 wherein $0.8 \leq g \leq 2$, $0 \leq h \leq 1$, e is from 1 to 2, $0 \leq j \leq 1$, $0 \leq h+j \leq 1$, and
L is selected from Al, Mn, Mg, Zr, La, or combinations thereof,

$Li_xNi_yCo_zL'1_{-y-z}O_q$         Formula 11 wherein, $0.65 \leq x \leq 1$, $0 \leq y \leq 1$, $0 \leq z \leq 1$, $0 \leq y+z \leq 1$, q ranges from 1.8 to 2, $0 \leq y+z \leq 1$,
and L' is selected from Al, Mn, Mg, Zr, La, or combinations thereof.

2. The rechargeable lithium battery of claim 1, wherein the mixed positive active material comprises 3 to 5 wt % of the second positive active material and 97 to 95 wt % of the first positive active material.

3. The rechargeable lithium battery of claim 1, wherein the first positive active material is at least one compound selected from the group represented by the following Formulae 1 to 9:

$Li_aA_{1-b}X_bD_2 (0.90 \leq a \leq 1.8, 0 \leq b < 0.5)$  Formula 1

$Li_aE_{1-b}X_bO_2\text{-}cD_c (0.90 \leq a \leq 1.8, 0 \leq b < 0.5, 0 \leq c \leq 0.05)$  Formula 2

$LiE_{2-b}X_bO_{4-c}D_c (0 \leq b << 0.5, 0 \leq c \leq 0.05)$  Formula 3

$Li_aCoG_bO_2 (0.90 \leq a \leq 1.8, 0.001 \leq b \leq 0.1)$  Formula 4

$Li_aMnG_bO_2 (0.90 \leq a \leq 1.8, 0.001 \leq b \leq 0.1)$  Formula 5

$Li_aMn_2G_bO_4 (0.90 \leq a \leq 1.8, 0.001 \leq b \leq 0.1)$  Formula 6

$Li_{(3-f)}J_2(PO_4)_3 (0 \leq f \leq 2)$  Formula 7

$Li_3Fe_2(PO_4)_3$  Formula 8

$LiFePO_4$  Formula 9 wherein A is selected from Co, Mn, or combinations thereof,

X is selected from Al, Ni, Co, Mn, Cr, Fe, Mg, Sr, V, a rare earth element, or combinations thereof, D is selected from O, F, S, P, or combinations thereof, E is selected from Co, Mn, or combinations thereof, G is selected from Al, Cr, Mn, Fe, Mg, La, Ce, Sr, V, or combinations thereof, and J is selected from V, Cr, Mn, Co, Ni, Cu or combinations thereof.

4. The rechargeable lithium battery of claim 1, wherein the rechargeable lithium battery has an N/P ratio of about 1.03 to about 1.12, which is the ratio of negative electrode capacity to positive electrode capacity.

5. The rechargeable lithium battery of claim 1, wherein the negative electrode has a potential of about 0.9V or less, which is measured by a measuring device of electrode potential in a 3-electrode system.

6. The rechargeable lithium battery of claim 1, wherein the composite negative active material comprises:
a crystalline carbon core formed with pores;
an amorphous carbon shell formed on the crystalline carbon core;
metal nano-particles dispersed in the pores; and
amorphous carbon present in the pores.

7. The rechargeable lithium battery of claim 1, wherein the elements T and Z are selected from the group consisting of Mg, Ca, Sr, Ba, Sc, Y, Ti, Zr, Hf, Rf, V, Nb, Ta, Db, Cr, Mo, W, Re, Bh, Fe, Ru, Os, Hs, Rh, Ir, Pd, Pt, Cu, Ag, Au, Zn, Cd, B, Al, Ga, In, Ti, Ge, P, As, Sb, Bi, S, Se, Te, or combinations thereof.

8. The rechargeable lithium battery of claim 6, wherein the composite negative active material has a porosity of about 30 to about 50 volume %.

9. The rechargeable lithium battery of claim 6, wherein:
the metal nano-particles have an average particle diameter of 600 nm or less, and
the concentration of the metal nano-particles is about 5 wt % or more.

10. The rechargeable lithium battery of claim 9, wherein the average particle size of the metal nano-particles is 100 nm to 500 nm.

11. The rechargeable lithium battery of claim 9, wherein the concentration of the metal nano-particles is 5 to 30 wt %.

12. The rechargeable lithium battery of claim 6, wherein the composite negative active material has a particle size of about 5 to about 40 μm.

* * * * *